(12) United States Patent
Chhabra et al.

(10) Patent No.: US 9,177,353 B2
(45) Date of Patent: Nov. 3, 2015

(54) SECURE RENDERING OF DISPLAY SURFACES

(71) Applicant: Intel Corporation, Santa Clara, CA (US)

(72) Inventors: Siddhartha Chhabra, Hillsboro, OR (US); Uday R. Savagaonkar, Portland, OR (US); Prashant Dewan, Hillsboro, OR (US); Michael A. Goldsmith, Lake Oswego, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 161 days.

(21) Appl. No.: 13/832,435

(22) Filed: Mar. 15, 2013

(65) Prior Publication Data
US 2014/0267332 A1 Sep. 18, 2014

(51) Int. Cl.
| | | |
|---|---|---|
| *G06T 1/00* | (2006.01) | |
| *G06T 1/60* | (2006.01) | |
| *G06F 3/147* | (2006.01) | |
| *G06F 21/84* | (2013.01) | |
| *H04N 21/426* | (2011.01) | |
| *H04N 21/431* | (2011.01) | |
| *H04N 21/4367* | (2011.01) | |
| *H04N 21/44* | (2011.01) | |
| *H04N 21/4408* | (2011.01) | |

(52) U.S. Cl.
CPC . *G06T 1/60* (2013.01); *G06F 3/147* (2013.01); *G06F 21/84* (2013.01); *H04N 21/42653* (2013.01); *H04N 21/4318* (2013.01); *H04N 21/4367* (2013.01); *H04N 21/44004* (2013.01); *H04N 21/4408* (2013.01); *G09G 2358/00* (2013.01)

(58) Field of Classification Search
CPC ..... G06F 21/606; G06F 21/445; G06F 21/53; G06F 12/14; G06F 21/00; G06F 21/123; G06F 2221/2107; G11B 20/00086
USPC .................................................. 345/522, 520
See application file for complete search history.

(56) References Cited

U.S. PATENT DOCUMENTS

| | | | |
|---|---|---|---|
| 7,284,135 B2* | 10/2007 | Evans et al. | 713/192 |
| 2009/0172331 A1* | 7/2009 | Vembu et al. | 711/163 |
| 2013/0044084 A1* | 2/2013 | Hendry | 345/204 |

* cited by examiner

*Primary Examiner* — Hau Nguyen
(74) *Attorney, Agent, or Firm* — Trop, Pruner & Hu, P.C.

(57) ABSTRACT

A protected graphics module can send its output to a display engine securely. Secure communications with the display can provide a level of confidentiality of content generated by protected graphics modules against software and hardware attacks.

29 Claims, 7 Drawing Sheets

SECURE RENDERING OF DISPLAY SURFACES

BACKGROUND

This relates generally to processor graphics sometimes called graphics processors or graphics processing units.

Processor graphics are increasingly being exposed to workloads which require some degree of security. Security sensitive workloads on processor graphics have relied on the operating system to provide the necessary security. However, the increasing number of malware attacks suggest that these solutions are not meeting the security requirements for a number of workloads.

Examples of workloads that may need trust computation frameworks on graphics processing units include bank transactions where a browser offloads part of a transaction to a graphics engine, antivirus engines where part of the pattern matching is offloaded to graphics engine, and medical imaging. In addition, many non-security workloads need added security, such as computer aided design, and graphical and other workloads need unhampered execution in the presence of malware. In addition, security sensitive workloads are being offloaded to processor graphics due to the power, efficiency and performance improvements achieved by graphics processors. Examples may include cryptographic functions, pattern matching primitives, and face detection algorithms as well as certain workloads for mining, oil refineries, financial calculations and other calculations involving money.

Security sensitive workloads may need a trust framework on processor graphics that not only enforces the correctness of execution of the workload but also enables strict access control of the graphics assets to only authorized entities.

Generally, the output of a workload needs to be displayed on a display screen. The display engine is responsible for displaying an output buffer on the screen. The display engine is a relatively primitive device that does not support having a command streamer or support sophisticated commands. Its primary job is to scrape the buffer and paste it on a display screen. Thus the display of buffer contents creates an opportunity for malicious intervention.

BRIEF DESCRIPTION OF THE DRAWINGS

Some embodiments are described with respect to the following figures.

DETAILED DESCRIPTION

A protected graphics module can send its output to a display engine securely. Secure communications with the display can provide a level of confidentiality of content generated by protected graphics modules against software and hardware attacks.

In accordance with some embodiments, a protected execution environment may be defined for processor graphics. This framework not only protects the workloads from malware running on the graphics processing unit but also protects those workloads from malware running on the central processing unit. In addition, the trust framework may facilitate proof of secure execution by measuring the code and data structures used to execute the workload. If a part of the trusted computing base of this framework or protected execution environment is compromised, that part can be patched remotely and the patching can be proven remotely throughout attestation in some embodiments.

Figure 1:
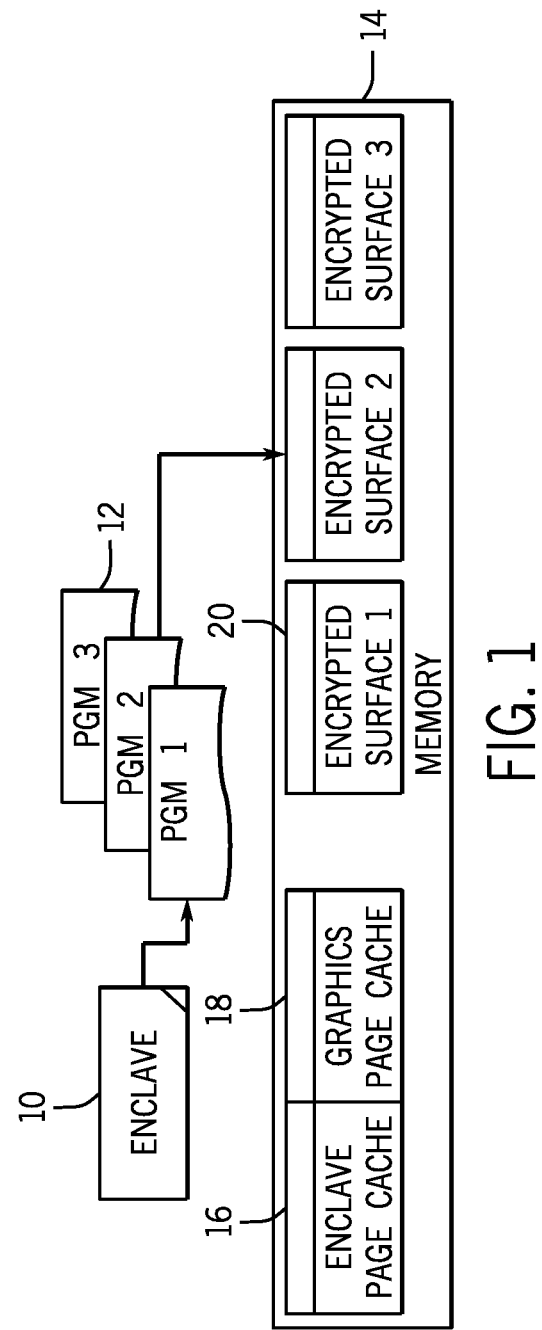
FIG. 1 is a pictorial diagram of one embodiment.

Referring to FIG. 1, protected graphics modules 12 (i.e. PGM1, PGM2 and PGM3), resident on processor graphics, contain code, data, and states needed for correct execution of a workload in the processor graphics. Similar to non-secure graphics workloads, the protected graphics module is created by software running on the central processing unit (CPU) by special CPU instructions. However, the protected graphics module can only be executed on the graphics processing unit in some embodiments. It may have the ability to assert correctness of execution to remote parties. In one embodiment, the module relies on the Secure Enclaves infrastructure to provide this assertion. See Patent Cooperation Treaty application number WO/2010/057065, published on May 20, 2010.

In Secure Enclaves, a protected execution environment is built inside an application. An operating system constructs an enclave using a set of privileged instructions. Once the enclave is constructed, the application can enter and exit the enclave using a set of unprivileged instructions. An enclave executes in a physically protected area of memory called the enclave page cache. The hardware ensures that memory pages belonging to the enclave page cache can only be accessed by the enclave that owns those pages, and also ensures that malicious privileged software cannot redirect memory accesses originating from an enclave in an unexpected fashion. Software executing inside an enclave can prove that the enclave was constructed correctly by the operating system via hardware based attestation.

The graphics page cache 18 in the memory 14 holds code and data used by the protected graphics modules (PGMs) 12. In one embodiment this section of memory is implemented in the system dynamic random access memory (DRAM) and is cryptographically protected by a memory encryption engine. In yet another embodiment, this section of memory is implemented inside the processor package as static random access memory (SRAM) or embedded DRAM (eDRAM). This section of memory may be managed by the operating system graphics driver using a set of privileged CPU instructions. It may not be accessible to either of them for purposes of read or write or execute. The modules 12 reside inside the graphics page cache 18. In one embodiment, the graphics page cache may be combined with an enclave page cache 16.

The enclave 10 is responsible for creating and initializing the modules 12. Once a module is created and initialized by the enclave 10, various hardware engines on the processor graphics can enter the module 12 using specific entry points. Additionally, after module initiation, the enclave itself can carry out portions of the secure computation, and can communicate with the module via the graphics page cache 18. In this regard, the enclave 10 is the central processing unit (CPU) counterpart of the modules 12 and it can have a one-to-many relationship with the modules 12.

The enclave 10 and modules 12 are both optional embodiments from the perspective of a developer. The application developer may decide whether an application needs a level of security provided by the combination of enclave and protected graphics module 12 in some embodiments.

Thus, within the memory, may be an enclave page cache 16, graphics page cache 18 including the modules 12 and the enclave 10 and one or more encrypted surfaces 20 to hold necessary data and/or instructions.

Figure 2:
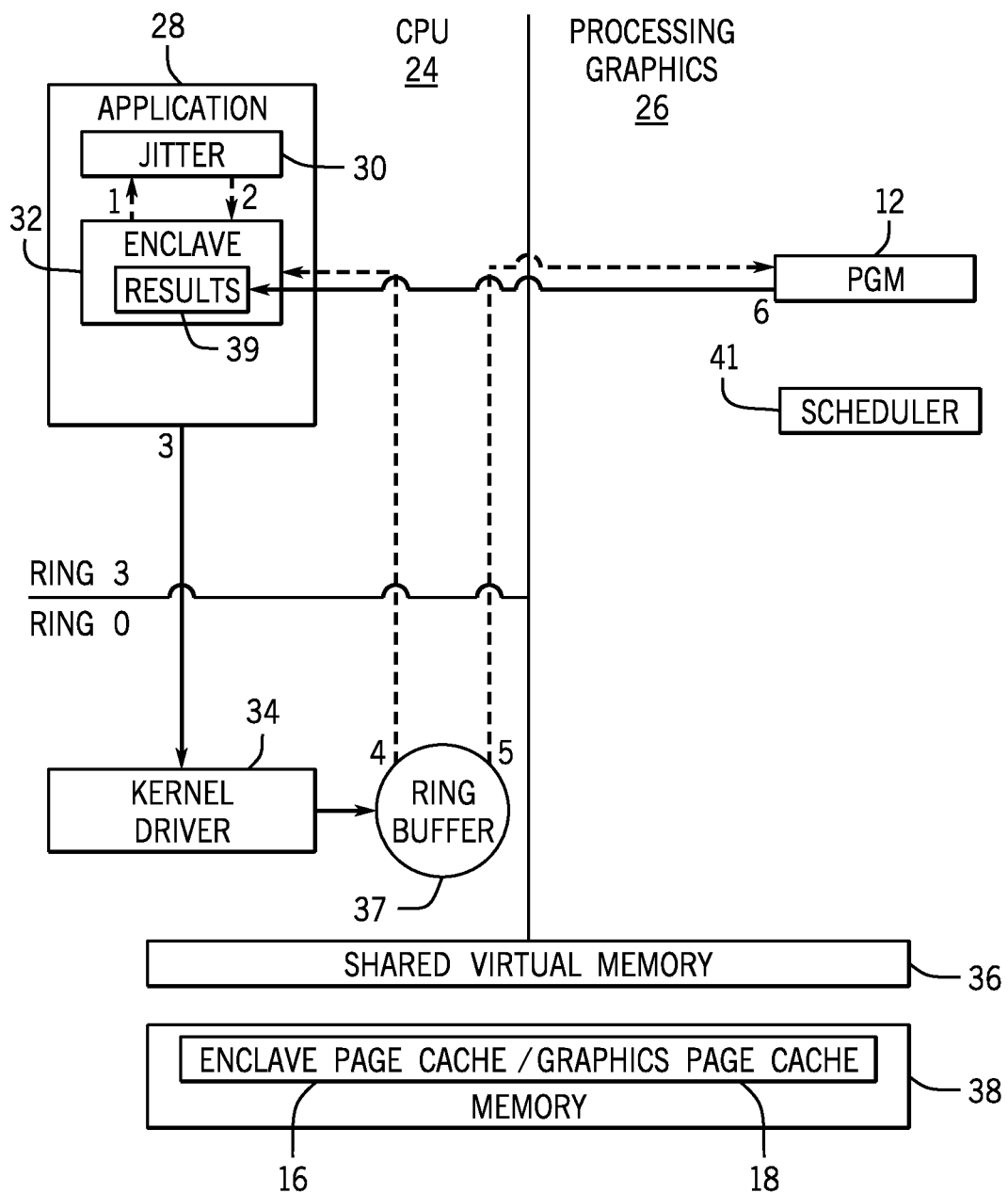
FIG. 2 is a diagram of the life cycle of a protected graphics module in accordance with one embodiment.

The processor graphics 26, shown in FIG. 2, includes the protected graphics module 12 while the application 28 is resident within the CPU 24. The CPU 24 may include a just in time execution engine (jitter) 30 and the enclave 32. It may also support a kernel driver 34. Shared virtual memory 36 may be shared between the central processing unit 24 and the processor graphics 26. Shared system memory 38 may store the enclave page cache 16 and graphics page cache 18.

Initially, the application 28 is launched on the CPU 24. This application is typically a ring three application launched in a process of its own. The application creates an enclave 32. The pages allocated for the enclave are allocated off of the enclave page cache 16. The enclave may contain metadata and metacode to create the protected graphics modules 12. The enclave also contains the jitter 30 for converting the module metacode from a high level language to the binary format that can be recognized by the graphics hardware. The enclave also contains metadata and metacode to create the modules 12.

To create a module 12, the enclave loads metacode and metadata from the graphics workload and measures or verifies the workload using appropriate crypto operations. This is indicated by the arrows 1 and 2 in FIG. 2. Then the enclave sets up the processor graphics state and the data structures needed for the execution of the module 12 in the graphics page cache 18.

The invocation of the module proceeds as follows. The enclave requests through the application, that the kernel mode graphics driver 34 execute the module by providing it relevant metadata. This is indicated by the arrow 3 in FIG. 2. The kernel mode graphics driver 34 (ring zero) takes the metadata and sets up the graphics engine state as per the metadata (arrow 4). The kernel graphics driver then points the processor graphics to the entry point of the module 12 via ring buffer 37 as indicated by the arrow 5. The kernel mode graphics driver maps the graphics page cache into the graphics address space by appropriately modifying the shared virtual memory 36 tables.

The processor graphics 26 executes the module 12 as indicated by the arrow 6. The graphics scheduler 41, within the processor graphics 26, informs the driver 34, which then closes the access to the graphics page cache provided for execution of the module 12. When the module 12 is scheduled for execution again, the graphics driver provides the graphics page cache access to the module and the module is executed. After the module completes its execution, it writes its results 39 of the execution to the output address inside the graphics page cache as indicated by the arrow 6. As specified in the metadata during the creation of the module 12, the fronting enclave subsequently reads the output and provides it to the central processing unit code executing inside the enclave.

In accordance with one embodiment, the module 12 may have a well-defined format in memory and the format is used to measure the unique components of the module and bind them to the results. The microcode measures the module at the time of execution by the enclave and provides a cryptographically signed measurement to the enclave. The enclave includes the measurement of the module and the measurement of the enclave and the combined data is used for attestation using the enclave attestation protocol.

In another embodiment, the module has an arbitrary format and is only understood by a loader inside the enclave. The enclave uses public key cryptography to verify the source of the module blob. The fact that the enclave enforces public verification is implicitly attested to by the enclave's measurement.

Even though the embodiment above pertains to processor graphics, these procedures can be applied to any co-processor/accelerator/device including crypto accelerators integrated on the same chip as the central processing unit.

Figure 3:
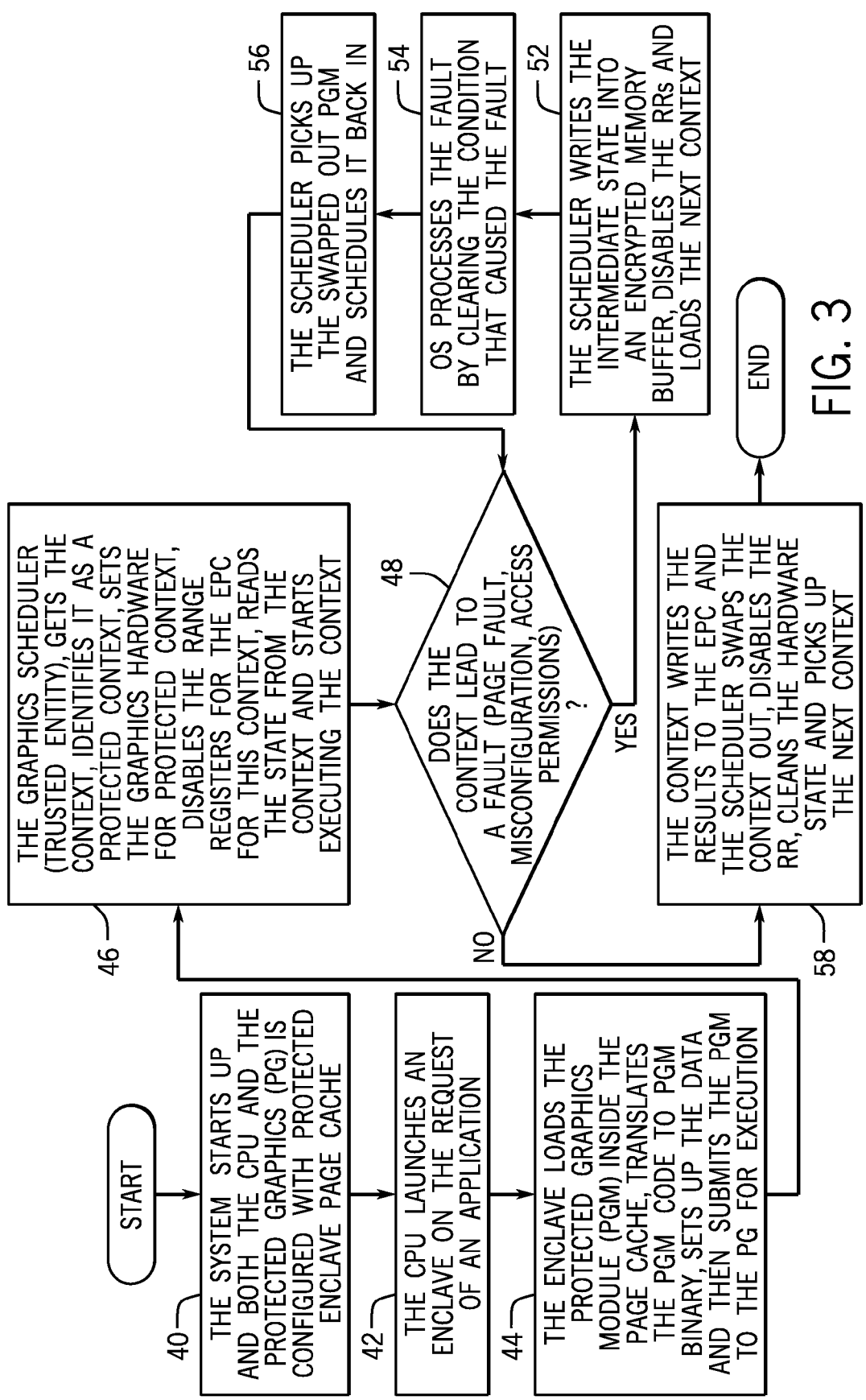
FIG. 3 is a flow chart for one embodiment.

Referring next to FIG. 3, a sequence depicted there may be implemented in software, firmware and/or hardware. In software and firmware embodiments it may be implemented by computer executed instructions stored in one or more non-transitory computer readable media such as magnetic, optical or semiconductor storages.

The sequence begins at block 40 when the system starts up and both the central processing unit and the protected graphics are configured with a protected enclave page cache. Then, in block 42, the central processing unit launches a enclave on the request of an application. The enclave may be protected from any untrusted CPU or protected graphics code by the hardware in the processor. Then, as shown in block 44, the enclave loads protected graphics module inside the page cache, translates the module code to module binary, sets up the data and then submits the module to the processor graphics for execution.

The graphics scheduler or command streamer 41, which is a trusted entity, gets a context, identifies it as protected context, sets the graphics hardware for protected context and reads the state from the context and starts executing the context as indicated in block 46. A protected context is allowed to access the enclave page cache. Then at diamond 48 a check determines whether the context leads to a fault such as page fault, misconfiguration, or access permissions. If so, the scheduler writes the intermediate state into an encrypted memory buffer, disables the range registers, and loads the next context as indicated in block 52. Then the operating system processes the fault by clearing the condition that caused the fault as indicated in block 54. The scheduler picks up the swapped out protected graphics module and schedules it back in as indicated in block 56. Then the flow returns back to the check at diamond 48.

If the context does not lead to a fault, then the context writes the result to the enclave page cache and the scheduler swaps the context out, and cleans the hardware state and picks up the next context as indicated in block 58. The workload might decide to send its results to the display engine.

The scheduler that schedules the protected graphics mode module may be trusted by the protected graphics module and may enjoy the same protections as the protected graphics module or it cannot read and write the protected graphics module but schedules it like a black box. The scheduler may be a software scheduler or a hardware scheduler or a combination of both. The enclave infrastructure may be one embodiment for trusted creation or execution of the protected graphics modules. The protected graphics modules can also be created in a trusted cloud environment and then executed on a client.

While the preceding discussion emphasizes a graphics device, however, in other embodiments any device that has computation capabilities that can be used as an offload device for computation or for security may benefit from the principles described herein. The modules may be provisioned with secrets after module distribution to customers.

In accordance with a first embodiment, protected audio video path (PAVP) hardware may be used to achieve secure display (PAVP was designed for securing premium content playback and for securing display bitmaps or images on a screen). A protected graphics module can declare a surface as a display surface. This can be achieved using a surface state linked to a secure surface binding table. Surfaces are data elements accessed by the graphics/display engine. Each surface has an associated state for e.g. location, format, size etc. which is specified by a data structure SURFACE_STATE. The graphics engine maintains a list of pointers to the surface state blocks in a table called the surface binding table. When a surface is accessed, its corresponding state is looked up by indexing into the surface binding table. Attributes may be added to this surface state that is linked through the surface binding table. These attributes tell that the surface is a protected graphics module display surface and that a key is associated with the writes to a surface. The writes to this surface by the graphics engines may be encrypted and reads may be either disallowed or they should return cipher text. This is done as graphics engines generating the display surfaces only need to write to these surfaces and do not need read access. Also, it may be undesirable for one protected graphics module to be able to read display surfaces of other protected graphics modules.

Figure 4:
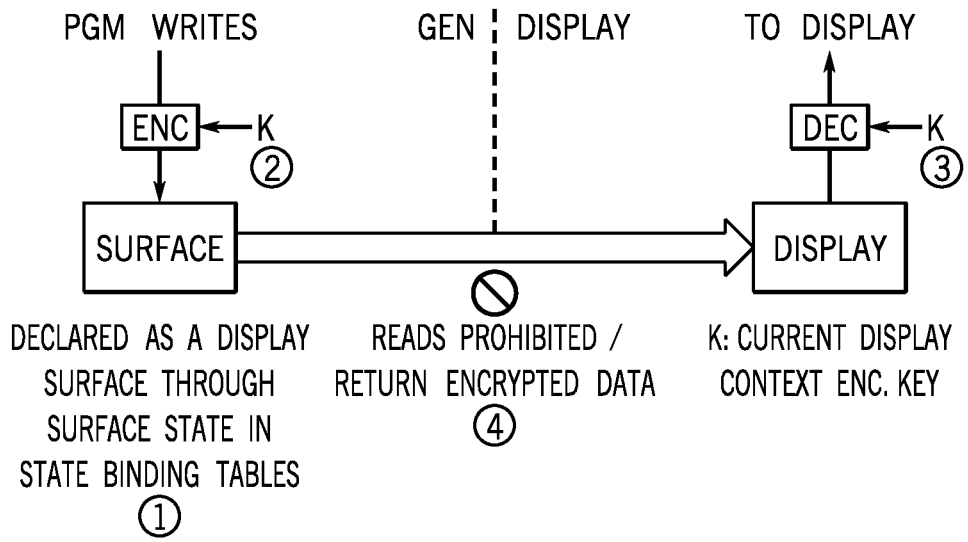
FIG. 4 is a schematic depiction of a first embodiment for a secure display.

Thus as shown in FIG. 4, a protected graphics module write is encrypted (enc) using a key K and stored on a surface. The surface is declared as a display surface through a surface state in a state binding table. Any data written to the display surface gets encrypted with the surface encryption key of the current display context. The encrypted display surface can only be read and decrypted by the display engine as indicated in FIG. 4 and not by the processor graphics (GEN) for example, or any other entity. The encrypted display surface is not read accessible by any other software components including other protected graphics modules. Hence, read accesses to the surface by any software components are forbidden or result in returning the encrypted data as indicated in FIG. 4. In order to read the data, the data must be decrypted using the encryption key and passed to a display.

Figure 5:
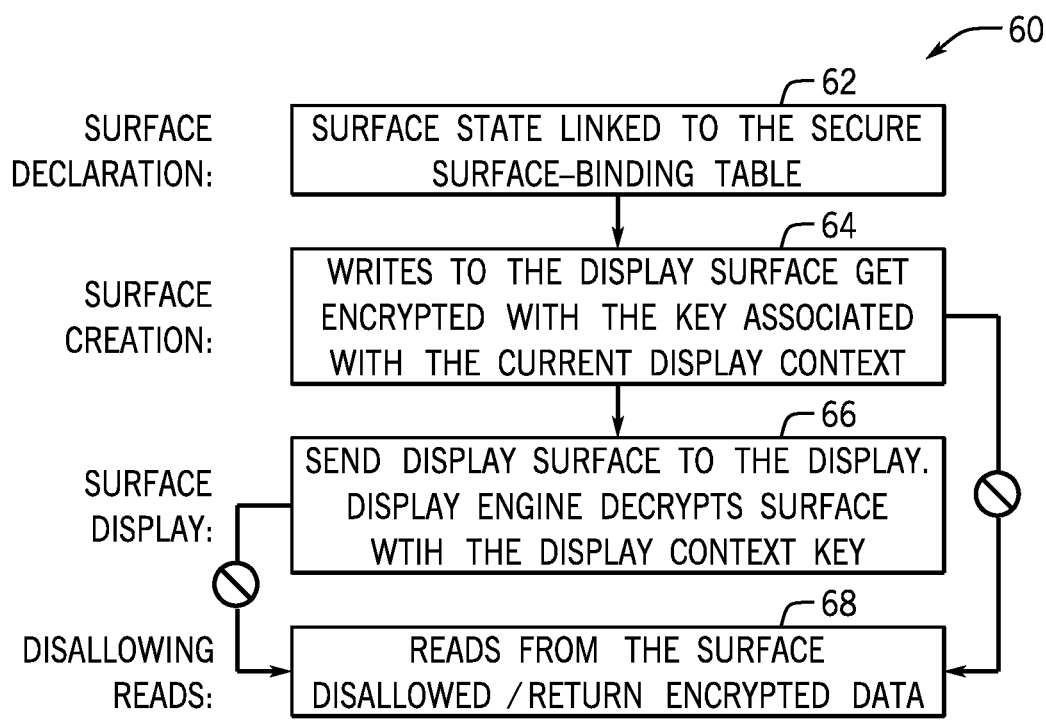
FIG. 5 is a flow chart for the first embodiment.

Thus referring to FIG. 5, a sequence 60 may be implemented in software, firmware and/or hardware. In software and firmware embodiments it may be implemented by computer executed instructions stored in one or more non-transitory computer readable media such as a magnetic, optical or semiconductor storage.

The sequence 60 begins with the surface declaration. A surface state is linked to a secure surface binding table as indicated in block 62.

In surface creation, indicated in block 64, writes to the display surface get encrypted with the key associated with the current display context. When an application requires secure display it creates a protected audio video path (PAVP) context, which essentially includes the keys etc. that will be used to secure that session. Similarly in one embodiment the display context is essentially the display state associated with an application (or enclave) that has requested the surface to be displayed securely. The display context includes the key that is used for encrypting/decrypting the display surface. Then, in surface display, the display surface is sent to the display (block 66). The display engine decrypts the surface with the display context key. As indicated in block 68, reads on the graphics side from the surface are disallowed or return only encrypted (unreadable) data.

This mechanism makes use of existing protected audio video path (PAVP) hardware and also with this mechanism, the display surface need not be allocated by the enclave page cache. Traditionally, protected audio video path technology allows reads from and writes out of the display surface; however, with protected graphics modules, in order to ensure isolation from other protected graphics modules and software components, reads from the surface are blocked or result are blocked, for example by returning encrypted data. Two crypto banks may be used in the display engine so as not to interfere with the current PAVP mechanism and not to enforce any policies or requirements on the keys that they use. Hence, there may be two different key banks, one for PAVP and one for secure rendering.

In accordance with a second embodiment, the display "logically" enters a protected graphics module. This mechanism may allow the display engine to logically enter the protected graphics module and use protected graphics entry structures to display the surface on the screen. A new protected graphics entry structure hardware universal identifier (ID) for the display engine, HWU_DISP is introduced. The protected graphics entry structure provides a pointer or graphics address to a surface that resides in the enclave page cache. When the software wants to display the protected graphic module surface, the software points the display engine to the appropriate protected graphics entry structure. The display engine uses the protected graphics entry structure to make an entry into the protected graphics module. Then the display engine loads the address of the display surface residing in the protected graphics entry structure. All accesses made by the display engine may be subject to access control mechanisms as described previously. Hence this mechanism involves modifications to the access control mechanism to allow a display to access a surface residing in the enclave page cache.

This mechanism also provides confidentiality to the contents of the display surface. An attacker cannot modify the contents of the surface without detection. Hence, the solution may also provide integrity protection to the display surface.

An expiry counter may be embedded in the protected graphics entry structure. The display decrements this counter on every refresh cycle and stops displaying the surface whenever the counter reaches zero. A modification may be necessary to allow the display to access the surface residing in the enclave page cache.

In order to not impact other secure enclave applications, running off the enclave page cache, the mechanism may warrant an increase in the enclave page cache. The enclave page cache size can be increased by either increasing the on-chip storage for route counters or by adding a tree-level to the replay-protection tree built over the enclave page cache. In order to not increase the on-chip storage requirements, the size of the enclave page cache may be increased by adding an additional level to the replay-protection tree.

The display surfaces, before being sent to the display engine, are worked upon by a composition manager. The composition manager is responsible for receiving surfaces from various applications, arranging them in a particular order, adding effects to the final surfaces, and sending the finally composed surface to the display. Composition, while still possible with the embodiments described herein, may still be restricted. With the first embodiment, since reads off the surface return encrypted data, the compositor cannot perform operations, such as blending, that work on the plaintext of surfaces. With the second embodiment composition can be supported by securing the compositor, as it will be handling plaintext display surface data. This securing can be done by encapsulating the compositor in an enclave. The compositor may need to be able to access other protected graphics module surfaces. This access may require a method to support secure and efficient enclave to enclave communication.

Figure 6:
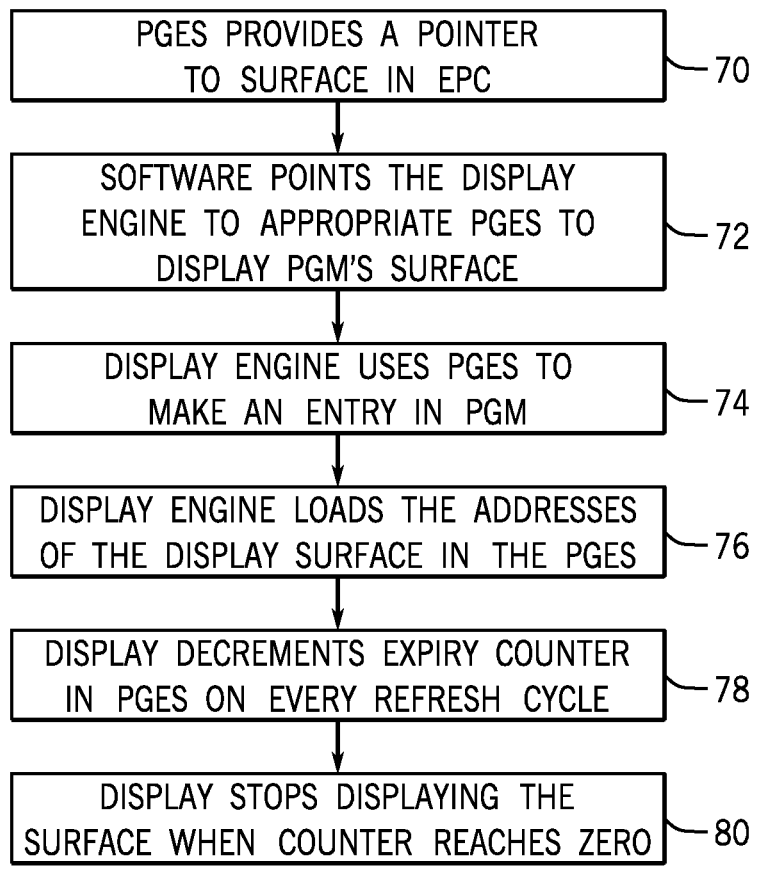
FIG. 6 is a flow chart for a second embodiment.

The sequence shown in shown in FIG. 6 may be implemented in software, firmware and/or hardware. In software and firmware embodiments it may be implemented by computer executed instructions stored in one or more non-transitory computer readable storage media such as magnetic, optical or semiconductor storage media. The sequence may be stored in a processor graphics, a central processing unit or other devices.

The sequence begins by the protected graphics entry surface (PGES) providing a pointer to a surface in the enclave page cache (EPC) as indicated in block 70. When the software wants to display the protected graphic module's (PGM's) surface, the software points the display engine to the appropriate protected graphics entry structure to display that surface as indicated in block 72.

Then the display engine uses the protected graphics entry structure to make an entry in the protected graphics module as indicated in block 74. The display engine loads the address of a display surface in the protected graphics entry structure as indicated in block 76. The display may decrement an expiry counter in the protected graphics entry structure on every refresh cycle as indicated in block 78. The display stops displaying the surface when the counter reaches zero as indicated in block 80.

Figure 7:
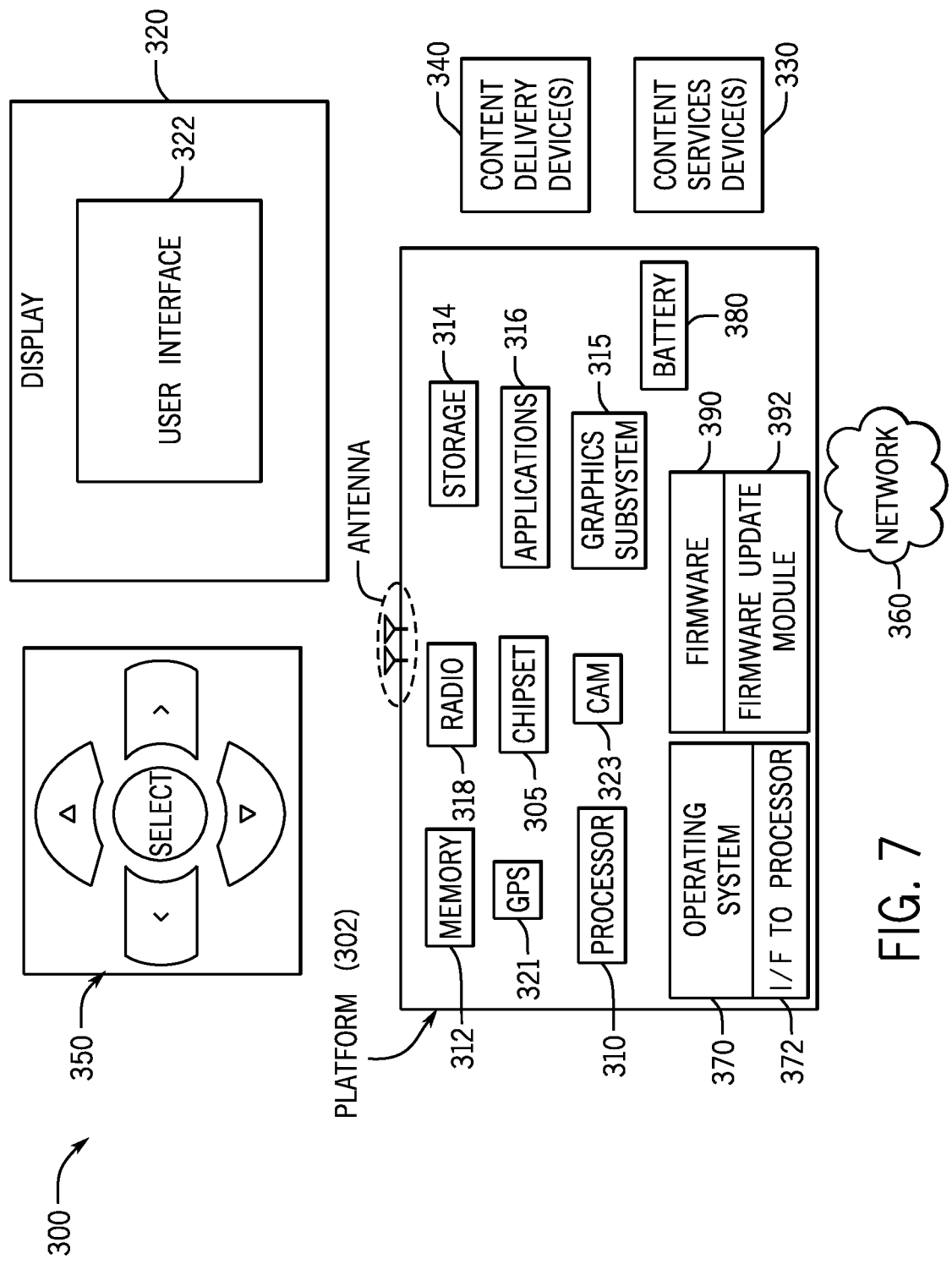
FIG. 7 is a system depiction for one embodiment.

FIG. 7 illustrates an embodiment of a system 300. In embodiments, system 300 may be a media system although system 300 is not limited to this context. For example, system 300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 300 comprises a platform 302 coupled to a display 320. Platform 302 may receive content from a content device such as content services device(s) 330 or content delivery device(s) 340 or other similar content sources. A navigation controller 350 comprising one or more navigation features may be used to interact with, for example, platform 302 and/or display 320. Each of these components is described in more detail below.

In embodiments, platform 302 may comprise any combination of a chipset 305, processor 310, memory 312, storage 314, graphics subsystem 315, applications 316 and/or radio 318. Chipset 305 may provide intercommunication among processor 310, memory 312, storage 314, graphics subsystem 315, applications 316 and/or radio 318. For example, chipset 305 may include a storage adapter (not depicted) capable of providing intercommunication with storage 314.

Processor 310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 310 may comprise dual-core processor(s), dual-core mobile processor(s), and so forth.

Memory 312 may be implemented as a volatile memory device such as, but not limited to, a Random Access Memory (RAM), Dynamic Random Access Memory (DRAM), or Static RAM (SRAM).

Storage 314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 314 may comprise technology to increase the storage performance enhanced protection for valuable digital media when multiple hard drives are included, for example.

Graphics subsystem 315 may perform processing of images such as still or video for display. Graphics subsystem 315 may be a graphics processing unit (GPU) or a visual processing unit (VPU), for example. An analog or digital interface may be used to communicatively couple graphics subsystem 315 and display 320. For example, the interface may be any of a High-Definition Multimedia Interface, DisplayPort, wireless HDMI, and/or wireless HD compliant techniques. Graphics subsystem 315 could be integrated into processor 310 or chipset 305. Graphics subsystem 315 could be a stand-alone card communicatively coupled to chipset 305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

In embodiments, display 320 may comprise any television type monitor or display. Display 320 may comprise, for example, a computer display screen, touch screen display, video monitor, television-like device, and/or a television. Display 320 may be digital and/or analog. In embodiments, display 320 may be a holographic display. Also, display 320 may be a transparent surface that may receive a visual projection. Such projections may convey various forms of information, images, and/or objects. For example, such projections may be a visual overlay for a mobile augmented reality (MAR) application. Under the control of one or more software applications 316, platform 302 may display user interface 322 on display 320.

In embodiments, content services device(s) 330 may be hosted by any national, international and/or independent service and thus accessible to platform 302 via the Internet, for example. Content services device(s) 330 may be coupled to platform 302 and/or to display 320. Platform 302 and/or content services device(s) 330 may be coupled to a network 360 to communicate (e.g., send and/or receive) media information to and from network 360. Content delivery device(s) 340 also may be coupled to platform 302 and/or to display 320.

In embodiments, content services device(s) 330 may comprise a cable television box, personal computer, network, telephone, Internet enabled devices or appliance capable of delivering digital information and/or content, and any other similar device capable of unidirectionally or bidirectionally communicating content between content providers and platform 302 and/display 320, via network 360 or directly. It will be appreciated that the content may be communicated unidirectionally and/or bidirectionally to and from any one of the components in system 300 and a content provider via network 360. Examples of content may include any media information including, for example, video, music, medical and gaming information, and so forth.

Content services device(s) 330 receives content such as cable television programming including media information, digital information, and/or other content. Examples of content providers may include any cable or satellite television or radio or Internet content providers. The provided examples are not meant to limit embodiments of the invention.

In embodiments, platform 302 may receive control signals from navigation controller 350 having one or more navigation features. The navigation features of controller 350 may be used to interact with user interface 322, for example. In embodiments, navigation controller 350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 350 may be echoed on a display (e.g., display 320) by movements of a pointer, cursor, focus ring, or other visual indicators displayed on the display. For example, under the control of software applications 316, the navigation features located on navigation controller 350 may be mapped to virtual navigation features displayed on user interface 322, for example. In embodiments, controller 350 may not be a separate component but integrated into platform 302 and/or display 320. Embodiments, however, are not limited to the elements or in the context shown or described herein.

In embodiments, drivers (not shown) may comprise technology to enable users to instantly turn on and off platform 302 like a television with the touch of a button after initial boot-up, when enabled, for example. Program logic may allow platform 302 to stream content to media adaptors or other content services device(s) 330 or content delivery device(s) 340 when the platform is turned "off." In addition, chip set 305 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 300 may be integrated. For example, platform 302 and content services device(s) 330 may be integrated, or platform 302 and content delivery device(s) 340 may be integrated, or platform 302, content services device(s) 330, and content delivery device(s) 340 may be integrated, for example. In various embodiments, platform 302 and display 320 may be an integrated unit. Display 320 and content service device(s) 330 may be integrated, or display 320 and content delivery device(s) 340 may be integrated, for example. These examples are not meant to limit the invention.

In various embodiments, system 300 may be implemented as a wireless system, a wired system, or a combination of both. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
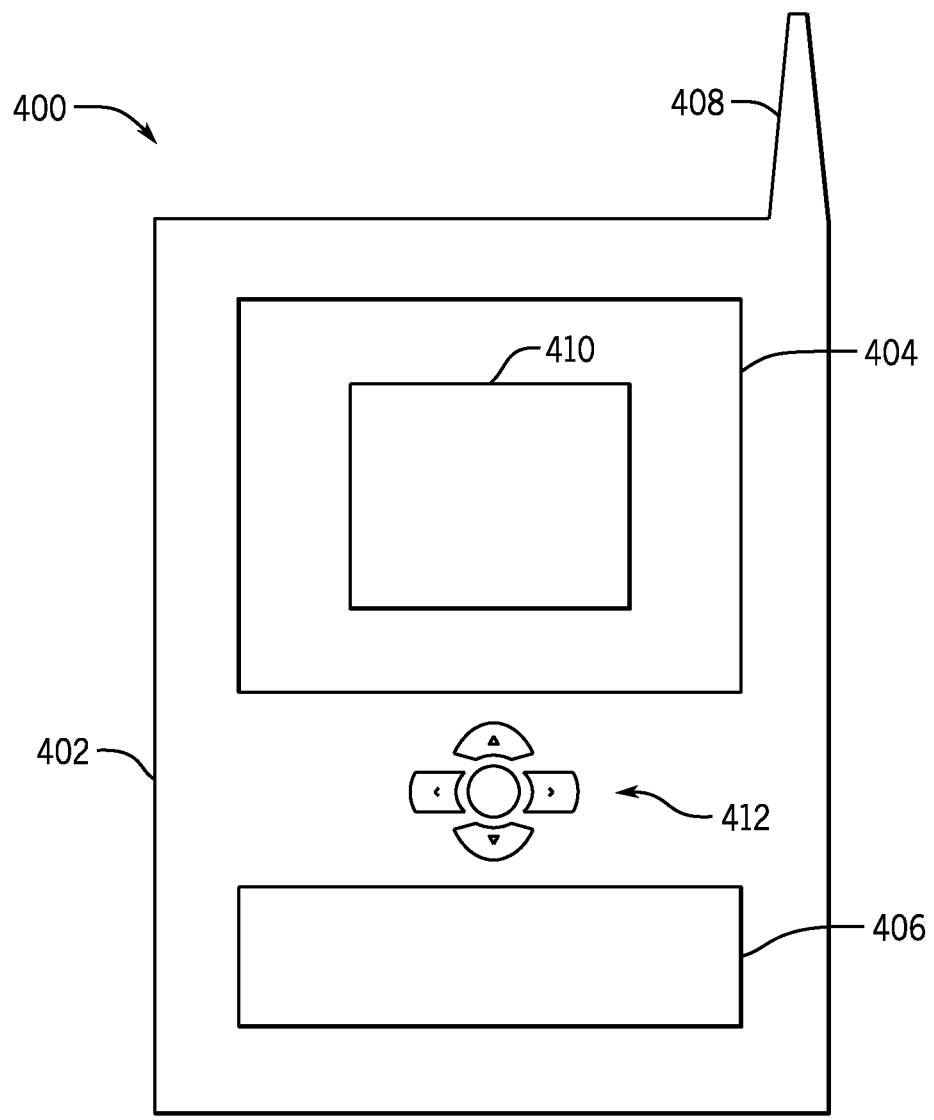
FIG. 8 is a front elevational view of one embodiment.

As described above, system 300 may be embodied in varying physical styles or form factors. FIG. 8 illustrates embodiments of a small form factor device 400 in which system 300 may be embodied. In embodiments, for example, device 400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 310 may communicate with a camera 322 and a global positioning system sensor 320, in some embodiments. A memory 312, coupled to the processor 310, may store computer readable instructions for implementing the sequences shown in FIGS. 2, 3, 4 and 5 in software and/or firmware embodiments. Particularly the sequences may be implemented by one or more non-transitory storage devices storing computer implemented instructions.

As shown in FIG. 8, device 400 may comprise a housing 402, a display 404, an input/output (I/O) device 406, and an antenna 408. Device 400 also may comprise navigation features 412. Display 404 may comprise any suitable display unit for displaying information appropriate for a mobile computing device. I/O device 406 may comprise any suitable I/O device for entering information into a mobile computing device. Examples for I/O device 406 may include an alphanumeric keyboard, a numeric keypad, a touch pad, input keys, buttons, switches, rocker switches, microphones, speakers, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The foregoing description of one or more implementations provides illustration and description, but is not intended to be exhaustive or to limit the scope to the precise form disclosed. Modifications and variations are possible in light of the above teachings or may be acquired from practice of various implementations of the invention.

The graphics processing techniques described herein may be implemented in various hardware architectures. For example, graphics functionality may be integrated within a chipset. Alternatively, a discrete processor graphics may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this disclosure.

What is claimed is:

1. A method comprising:
   sending an output from a protected graphics module to a display engine, wherein said module is part of a graphics processor, said module to assert correctness of execution to a remote party, and said module only executable on said graphics processing unit;
   displaying the output on a display screen using the display engine; and
   enabling the display engine to enter the protected graphics module.

2. The method of claim 1 including linking a display surface to a secure surface binding table.

3. The method of claim 2 including blocking reads from the display surface.

4. The method of claim 3 including encrypting writes to the display surface using a key associated with the current display context.

5. The method of claim 1 including using a protected graphics entry surface to display a surface.

6. The method of claim 1 including using the protected graphics entry surface to provide a way to access the surface.

7. The method of claim 6 including providing a way to access the surface residing in an enclave page cache.

8. The method of claim 7 including providing a way to access the surface in the enclave page cache using the protected graphics entry structure.

9. The method of claim 8 including decrementing an expiry counter in the protected graphics entry structure on a refresh cycle.

10. One or more non-transitory computer readable media storing instructions executed by a processor to perform a sequence comprising:
    providing a secure output from a protected graphics module to a display engine, wherein said module is part of a graphics processor, said module to assert correctness of execution to a remote party, and said module only executable on said graphics processing unit;
    displaying the output on a display screen using the display engine and;
    enabling the display engine to enter the protected graphics module.

11. The media of claim 10, said sequence including linking a display surface to a secure surface binding table.

12. The media of claim 11, said sequence including blocking reads from the display surface.

13. The media of claim 12, said sequence including encrypting writes to the display surface using a key associated with the current display context.

14. The media of claim 10, said sequence including using a protected graphics entry surface to display a surface.

15. The media of claim 14, said sequence including enabling a display engine to enter a protected graphics module.

16. The media of claim 15, said sequence including using the protected graphics entry surface to provide a way to access the surface.

17. The media of claim 16, said sequence including providing a way to access the surface residing in an enclave page cache.

18. The media of claim 17, said sequence including providing a way to access the surface in the enclave page cache using the protected graphics entry structure.

19. The media of claim 18, said sequence including decrementing an expiry counter in the protected graphics entry structure on a refresh cycle.

20. An apparatus comprising:
a storage: and
a processor, coupled to the storage, to provide a secure output of a protected graphics module for display on a display screen, using a display engine, wherein said module is part of a graphics processor, said module to assert correctness of execution to a remote party, and said module only executable on said graphics processing unit, to said display engine to enter the protected graphics module.

21. The apparatus of claim 20, said processor to link a display surface to a secure surface binding table.

22. The apparatus of claim 21, said processor to block reads from the display surface.

23. The apparatus of claim 22, said processor to encrypt writes to the display surface using a key associated with the current display context.

24. The apparatus of claim 20, said processor to use a protected graphics entry surface to display a surface.

25. The apparatus of claim 24, said processor to enable a display engine to enter a protected graphics module.

26. The apparatus of claim 25, said processor to use the protected graphics entry surface to provide a way to access the surface.

27. The apparatus of claim 20 including an operating system.

28. The apparatus of claim 20 including a battery.

29. The apparatus of claim 20 including firmware and a module to update said firmware.

\* \* \* \* \*